United States Patent Office 3,781,254
Patented Dec. 25, 1973

3,781,254
PROCESS FOR THE PRODUCTION OF POLYMERS IN THE PRESENCE OF A REDOX CATALYST SYSTEM
Friedrich Engelhardt, Frankfurt am Main, and Joachim Ribka, Offenbach am Main, Germany, assignors to Cassella Farbwerke Mainkur Aktiengesellschaft, Frankfurt am Main, Germany
No Drawing. Filed July 31, 1972, Ser. No. 276,598
Claims priority, application Germany, Aug. 10, 1971, P 21 39 959.7
Int. Cl. C08f 3/90, 15/22
U.S. Cl. 260—85.5 R          4 Claims

ABSTRACT OF THE DISCLOSURE

Compounds of the formula

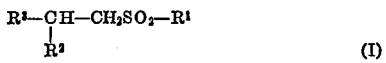

(I)

wherein $R^1$ is alkyl, cycloalkyl, aryl, aralkyl, one of the aforesaid radicals substituted by lower alkyl or chlorine, or

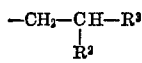

$R^2$ is hydrogen or methyl and $R^3$ is carboxyl, carboxylate base addition salt radical,

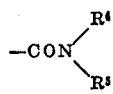

wherein $R^4$ and $R^5$ are hydrogen or alkyl, cyano, $COOR^6$ wherein $R^6$ is alkyl, alkanoyl, cycloalkanoyl, benzoyl, phenylacetyl or one of said

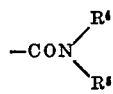

$COOR^6$ alkanoyl, cycloalkanoyl, benzoyl or phenylacetyl radicals substituted by lower alkyl or chlorine are used as reducing component in a redox catalyst system in the polymerization of olefinically unsaturated monomers.

The use of sulfinic acids in redox catalyst systems as initiators for the polymerization of olefinically unsaturated monomers is known. Additionally, derivatives of sulfinic acids, as disclosed in German DAS 1,016,935 and German DBP 1,301,516, are effective as reducing components in the polymerization of olefinic monomers in redox catalyst systems.

It has now been unexpectedly found that sulfones of the formula:

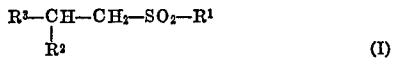

(I)

wherein $R^1$ is alkyl having 1 to 8 carbon atoms, cycloalkyl having 4 to 8 carbon atoms, aryl having 6 to 12 carbon atoms, aralkyl having 7 to 10 carbon atoms, one of the aforesaid radicals substituted by lower alkyl or chlorine, or

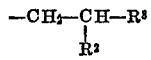

$R^2$ is hydrogen or methyl and $R^3$ is carboxyl, carboxylate base addition salt radical,

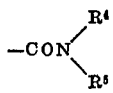

wherein $R^4$ and $R^5$ are hydrogen or alkyl having 1 to 4 carbon atoms, cyano, $COOR^6$ wherein $R^6$ is alkyl having 1 to 6 carbon atoms, alkanoyl having 2 to 6 carbon atoms, cycloalkanoyl having 5 to 7 carbon atoms, benzoyl, phenylacetyl or one of said

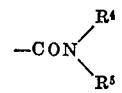

$COOR^6$, alkanoyl, cycloalkanoyl, benzoyl or phenylacetyl radicals substituted by lower alkyl or chlorine may be employed as reducing component in a redox polymerization of olefinically unsaturated monomers.

Preferably, $R^1$ is alkyl having 1 to 4 carbon atoms, cyclohexyl, phenyl, naphthyl, benzyl, phenethyl, one of the aforesaid radicals substituted by lower alkyl or chlorine or

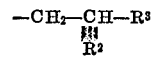

The preferred cycloalkanoyl moiety for $R^3$ is cyclohexanoyl. The preferred base addition salts for forming the carboxylate base addition salt radicals are those of sodium, potassium and ammonium.

The present invention is, accordingly, concerned with an improvement in the process for producing homopolymers and copolymers from olefinically unsaturated monomers in the presence of a redox catalyst system which involves using (1) as reducing component in the redox catalyst system, a compound of the formula

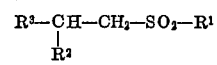

wherein $R^1$, $R^2$ and $R^3$ are as aforesaid and (2) as the oxidizing component, a member selected from the group consisting of inorganic and organic per compounds.

A particular advantage of the process of the present invention is that the initiated polymerization reaction proceeds slowly with but a small temperature increase, i.e., the reaction is of prolonged duration. As a result, the polymer is generally completely colorless, optically perfect and of high molecular weight.

Suitable monomers for the preparation of homopolymers and copolymers of the present invention include, for example, acrylic acid, methacrylic acid, their salts, esters and amides, methylolacrylamide and methylolmethacrylamide and their reaction products with amines and alcohols, vinyl pyrrolidone, vinyl carbazole, vinylmethylketone, acrylonitrile, vinylidene cyanide, esters of unsaturated alcohols such as vinyl acetate, diallylphthalate, styrene, α-methylstyrene, vinyl toluene, styrene halides and allylbenzene.

In accordance with the present invention, it is, of course, possible to use a mixture of two or more of the compounds of Formula I as the reducing component of the redox catalyst systems used in the present invention.

Typical examples of the reducing components of Formula I include:

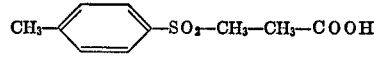

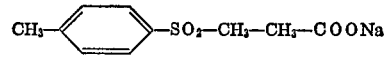

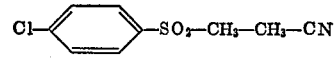

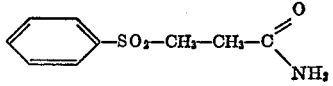

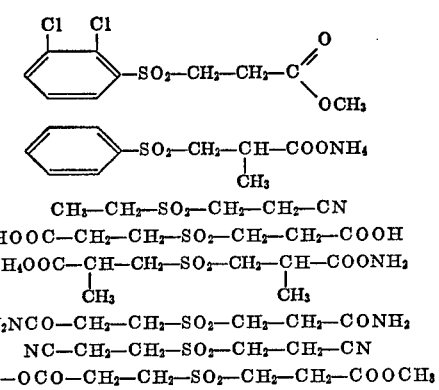

CH₃—CH₂—SO₂—CH₂—CH₂—CN
HOOC—CH₂—CH₂—SO₂—CH₂—CH₂—COOH
NH₄OOC—CH—CH₂—SO₂—CH₂—CH—COONH₄
          |                    |
          CH₃                  CH₃
H₂NCO—CH₂—CH₂—SO₂—CH₂—CH₂—CONH₂
NC—CH₂—CH₂—SO₂—CH₂—CH₂—CN
CH₃—OCO—CH₂—CH₂—SO₂—CH₂—CH₂—COOCH₃

Those skilled in the art will appreciate that the compounds of Formula I are either old in the art or may be prepared by methods well known in the art. For example, sulfinic acids of Formula II may be added to the double bond of an olefinic compound of Formula III in accordance with the reaction scheme:

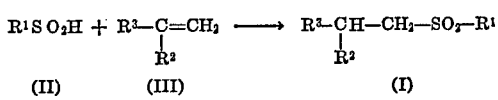

Another procedure involves reacting formaldehyde sulfoxylate of Formula IV with the olefinic compound of Formula III in accordance with the reaction scheme:

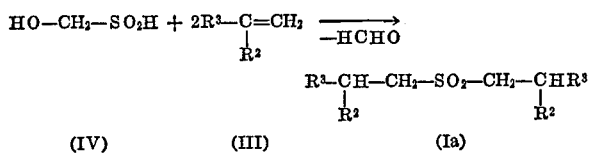

In connection with the foregoing, see, for example, German DBP 1,097,434 and Chemische Berichte 104, 2035–2043 (1971).

As previously indicated, the oxidizing component of the redox catalyst system of the process of the present invention may employ both inorganic and organic per compounds such as benzoyl peroxide, tert. butylhydroperoxide, di-tert. butylperoxide, lauroyl peroxide, cumene hydroperoxide, acetyl peroxide, methylethylketone peroxide, hydrogen peroxide, potassium, sodium or ammonium peroxydisulfate.

The preparation of the polymers of the process of the present invention may be by precipitation, emulsion, solution or bulk polymerization. Particularly suitable results are achieved in the preparation of homopolymers and copolymers of acrylamide, both in aqueous solution, as well as in precipitation polymerization from organic solvents. The homopolymers and copolymers prepared in this manner are distinguished by complete absence of color, superior water solubility and high molecular weight. The polymerization procedure of the process of the present invention is carried out in a known manner at pressures of up to 250 atmospheres and at temperatures between 0 and 120° C., preferably between 20 and 70° C. The concentration of the compounds of Formula I is preferably 0.02 to 1.5% by weight and the concentration of the oxidating component is preferably between 0.25 and 2.0% by weight, said percentages being based on the weight of the monomer or monomers employed.

The following examples are for the purpose of illustrating the present invention.

EXAMPLE 1

A composition of 100 g. acrylonitrile, 50 g. acrylamide, 1200 ml. deionized water and 0.1 ml. aqueous 0.1% FeSO₄ solution are introduced into a polymerization vessel equipped with a stirrer, reflux condenser, gas inlet pipe, two inlets and a water bath. After the expulsion of air by nitrogen, there was added 1 g. NaCl, as well as 1.5 g. of a compound of the formula

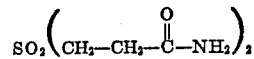

The temperature of this mixture was brought to 55° C. and dropwise addition of a 0.5% aqueous solution of K₂S₂O₈ was initiated. As soon as the reaction had begun (about 10 minutes) and the temperature in the reaction vessel had risen from about 55 to about 58° C., 100 g. additional acrylonitrile, as well as 150 ml. K₂S₂O₈ solution were fed into the polymerization vessel from a storage vessel over a period of about one hour. Upon completion of the reaction, stirring was continued for another hour at 70° C.

The polymer obtained was filtered off and dried. Solutions in dimethylformamide and dimethylsulfoxide were completely colorless. The K-value was 156.

EXAMPLE 2

Into a reaction vessel having walls coated with polyethylene, there was introduced 250 g. acrylamide and 0.85 g. 50% NaOH dissolved in 750 ml. deionized water. During the introduction of nitrogen, there was added to the foregoing solution 0.5 g. NaCl, 0.20 ml. of a copper acetylacetonate solution (1 g. solution corresponds to 12.3 cupric ion), 0.3 g. of the compound of the formula

SO₂(CH₂COOH)₂ and 0.25 g. ammonium peroxydisulfate. The catalyzed reaction mixtuure initially was at 20° C. After about one hour, polymerization began and the temperature of the mixture rose to 90–92° C.

The product of the polymerization was a non-flowable, completely clear and colorless polymer in the form of a water-soluble gelatin.

The relative viscosity of a 0.05% solution of the product in 1 N sodium nitrate at 25° C. was 1.54.

We calim:

1. In the process for producing homopolymers and copolymers of olefinically unsaturated monomers in the presence of a redox catalyst system, the improvement comprising using (1) as reducing component in the redox catalyst system a compound of the formula

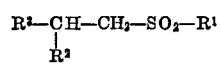

wherein R¹ is alkyl having 1 to 8 carbon atoms, cycloalkyl having 4 to 8 carbon atoms, aryl having 6 to 12 carbon atoms, aralkyl having 7 to 10 carbon atoms, one of the aforesaid radicals substituted by lower alkyl or chlorine, or

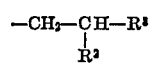

R² is hydrogen or methyl and R³ is carboxyl, carboxylate base addition salt radical,

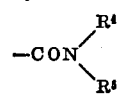

wherein R⁴ and R⁵ are hydrogen or alkyl having 1 to 4 carbon atoms, cyano, COOR⁶ wherein R⁶ is alkyl having 1 to 6 carbon atoms, alkanoyl having 2 to 6 carbon atoms, cycloalkanoyl having 5 to 7 carbon atoms, benzoyl phenylacetyl or one of said

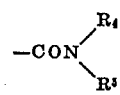

COOR⁶, alkanoyl, cycloalkanoyl, benzoyl or phenylacetyl radicals substituted by lower alkyl or chlorine and (2) as the oxidizing component an inorganic or organic per compound.

2. The process of claim 1 wherein $R^1$ is alkyl having 1 to 4 carbon atoms, cyclohexyl, phenyl, naphthyl, benzyl, phenethyl, one of the aforesaid radicals substituted by lower alkyl or chlorine, or

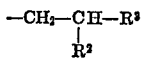

3. The process of claim 1 wherein said reducing component is of the formula

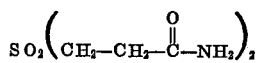

4. The process of claim 1 wherein said reducing component is of the formula

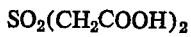

References Cited
UNITED STATES PATENTS

| | | | |
|---|---|---|---|
| 2,768,156 | 10/1956 | Bredereck et al. | 260—89.7 R |
| 3,441,533 | 4/1969 | Suling et al. | 260—85.5 D |
| 3,453,249 | 7/1969 | Szita et al. | 260—85.5 R |
| 3,476,717 | 11/1969 | Von Brachel et al. | 260—89.7 R |
| 3,483,208 | 12/1969 | Bahr et al. | 260—85.5 D |

HARRY WONG, JR., Primary Examiner

U.S. Cl. X.R.

252—426; 260—63 UY, 78.4 N, 78.4 UA, 80 C, 86.1 R, 88.3 R, 88.3 L, 88.7 D, 89.1, 89.5 A, 89.7 R, 91.5, 93.5 R